United States Patent
Oe et al.

(10) Patent No.: US 6,369,364 B1
(45) Date of Patent: Apr. 9, 2002

(54) ELECTRIC THERMO POT

(75) Inventors: Jun Oe; Satoshi Shimizu; Hidekata Kawanishi, all of Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/834,781

(22) Filed: Apr. 13, 2001

(30) Foreign Application Priority Data

Apr. 13, 2000 (JP) .............................. 12-111763

(51) Int. Cl.7 ................................. A47J 27/21
(52) U.S. Cl. ...................... 219/438; 219/441; 222/146.5
(58) Field of Search ................... 219/438, 429, 219/430, 441; 222/146.5; 220/573.1–573.4

(56) References Cited

U.S. PATENT DOCUMENTS 5,582,754 A  * 12/1996  Smith et al. ................. 219/438
6,121,585 A  *  9/2000  Dam ........................... 219/438

* cited by examiner

*Primary Examiner*—Joseph Pelham
(74) *Attorney, Agent, or Firm*—Ratner & Prestia

(57) ABSTRACT

An electric thermo pot provided with a coating layer formed on the inner surface of the vessel containing powdered charcoal. Electric thermo pot of the present invention improves quality of liquid kept therein. It is generally believed that the liquid quality is improved presumably by infrared ray radiated from the powdered charcoal contained in the layer. Presumable causes for the improvement also include a very small amount of certain elements dissolving out of the powdered charcoal into the liquid and an effect of absorption pertinent to the powdered charcoal.

11 Claims, 1 Drawing Sheet

ELECTRIC THERMO POT

FIELD OF THE INVENTION

The present invention relates to an electric thermo pot that provides hot water with good taste.

BACKGROUND OF THE INVENTION

Some of electric thermo pots (hereinafter simply referred to as pot) have been provided with a fluororesin layer as the inner coating of vessel. The inner coating layer is aimed mainly for keeping pot vessel free from fur or the like contamination. Such inner coating layer sometimes ill-affects taste of the liquid kept in the vessel, to a deteriorated flavor of beverages prepared using the liquid. In some of pots recently introduced to the market, the deterioration in the taste caused by the layer has been alleviated to be within a certain acceptable level through an optimized combination of the layer materials and optimized processing conditions for forming the inner coating layer.

However, even such newly introduced pots are not provided with a function of improving taste, or quality, of liquid kept therein.

The present invention addresses the above-described problems, and aims to provide pots with a positive function of improving taste, or quality, of water, hot water, beverage or the like liquids kept in the pot.

SUMMARY OF THE INVENTION

A pot in accordance with the present invention is provided with a coating layer formed of material containing powdered charcoal on the inner surface of the vessel for keeping liquid. When the pot is used, quality of the liquid improves in itself. Reason why the liquid improves in its quality is not definitely specified yet; however, it has been empirically confirmed through comparative tasting conducted with Japanese teas and other beverages.

Presumed reasons include; that the infrared ray radiated from the charcoal powder contained in the coated layer improves the water quality as is generally believed, that a very small amount of certain elements dissolving out of the charcoal powder is effective to improve the quality, and that the absorption property pertinent to the powdered charcoal provides a good influence to the quality.

DESCRIPTION OF THE PREFERRED EMBODIMENTS

Figure 1:
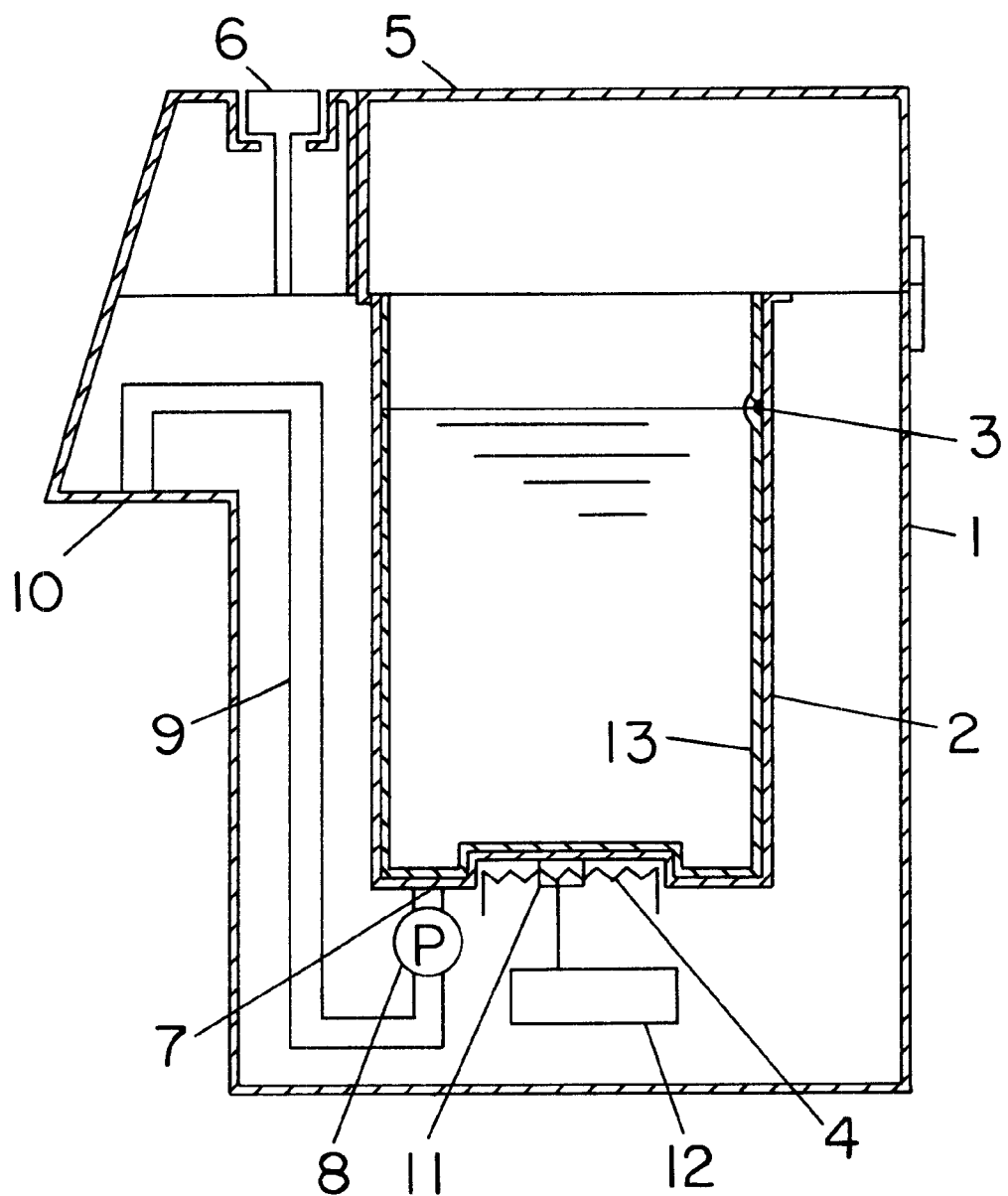
FIG. 1 is a cross sectional view of a pot in accordance with an example of the present invention.

A pot of the present invention is provided with a coating layer containing powdered charcoal on the inner surface of the vessel to cover at least a region making direct contact with liquid in the vessel.

In pots, temperature of a liquid, water for example, kept in the vessel rises to the boiling point; as a result, the inner coating layer which makes direct contact with the water also rises to almost the same temperature. So, infrared ray radiation from the coating layer is expected to be enhanced accordingly. Dissolving of the layer composition materials into the liquid that shifts the liquid to alkaline is also expected to increase. Since pots generally keep liquid at a high temperature for a long time, the above-described effects are expected to be further enhanced.

Inner coating layer of the present invention contains powdered charcoal of 0.5–50 weight %.

The quality improvement effects start to emerge when the coating layer contains powdered charcoal of 0.5 weight % or more. The improvement effects are thought to be caused by the infrared ray radiation from the powdered charcoal and a very small amount of composition elements eluted from the powdered charcoal. On the other hand, if contents of powdered charcoal is in excess of 50 weight %, the adhesion strength of coating layer to the vessel material and the anti-corrosion capacity of the coating layer deteriorate, at the same time dissolving of impurities from the powdered charcoal becomes too excess. These are the factors that often deteriorate the taste of liquid kept in the pot. Thus, inclusion of the powdered charcoal in the layer should preferably be within a range of 0.5–50 weight %. In so far as contents of the powdered charcoal stay within the range, the coating layer improves liquid quality, while deterioration in the adhesion property and the anti-corrosion property are avoided, and deterioration in the liquid taste due to inclusion of too much impurities is prohibited.

An approximate thickness of the layer formed by one coating procedure on the inner surface of vessel is normally 10–20 $\mu$m thick. If particle diameter of the charcoal powder is in excess of 10 $\mu$m, the particles are often exposed in part to the outside from the layer. As charcoal powder mainly consists of conductive carbon, the coating layer has a tendency to be deteriorated. Further, particles of the charcoal powder may often show up in a contact surface between the coating layer and a surface of the vessel. This leads to a weaker adhesion between the coating layer and the surface of the vessel, and a greater surface roughness of the coating layer which results in a lower dirt-prevention property. Thus, diameter of the charcoal particle should preferably be not greater than 10 $\mu$m. Charcoal powder finer than 10 $\mu$m in the particle diameter provides a pot with the coating layer with a superior anti-corrosion property, a dependable adhesion characteristic and a dirt-prevention property at the surface.

As to impurities in the charcoal powder, iron contents, among others, should preferably be not higher than 0.1 weight %. Usually, an iron hammer is used for crushing charcoal into powder. So, a very small amount of iron is inevitably included in the charcoal powder. When the iron contents are in excess of 0.1 weight % to the powdered charcoal, it may invite a poor anti-corrosion property with the layer, or a deteriorated taste with beverage kept in the pot. Thus, it is preferred that the iron content in the powdered charcoal is not higher than 0.1 weight %. A pot provided with the above described layer will be free from deterioration in the anti-corrosion property and deterioration in the taste.

A pot of the present invention is further provided with an coating layer in which carbon black is added for more than 1 weight %. Inclusion of carbon black for more than 1 weight % insures the infrared ray radiation effects from the coating layer. Which means that the carbon black reduces the necessary amount of charcoal powder to be added. The reduction in quantity of powdered charcoal contributes to not only cost saving but it is also advantageous in prohibiting inclusion of unnecessary impurities pertinent to the powdered charcoal into the coating layer. Thus, the carbon black added works to suppress the degree of deterioration in the adhesion property and the anti-corrosion capacity of the coating layer. It is also advantageous in suppressing deterioration in the taste of beverage kept in the pot.

A pot of the present invention uses powder of a charcoal called "Bincho-tan", for the powdered charcoal. Bincho-tan charcoal is a local produce from Kumano District, Wakayama Prefecture, Japan. The charcoal features a high fire intensity. Bincho-tan charcoal is made of a tree called Ubamegashi (*Quercus phillyraeoides* A. Grey), produced by carbonizing at the highest temperature among various kinds other charcoals. As compared with ordinary black charcoals made of Japanese oak or other trees, Bincho-tan charcoal contains a higher content of alkali metal elements such as sodium, potassium. So, the pH value of a liquid kept in a pot is readily shifted to the alkaline side. A slight shift to the alkaline side in pH value improves the liquid quality. While ordinary black charcoals of Japanese oak or other kinds of trees are carbonized at a temperature around 400–700° C., the carbonizing temperature for Bincho-tan charcoal is as high as 1100–1300° C. Therefore, the latter charcoal contains less impurities, which is a factor of deteriorating the liquid quality. Thus, the use of powdered Bincho-tan charcoal for the powdered charcoal is advantageous in improving the beverage taste, and in suppressing the taste deterioration that is caused by impurities contained in the powdered charcoal.

A pot of the present invention further uses an coating layer that contains fluoro-carbon resin.

Inorganic staff such as powdered charcoal, carbon black, added to the coating layer enhance the hydrophilic property of the layer; as a result the layer readily gathers dirt on the surface. When a fluoro-carbon resin is added to the coating layer, a certain hydrophobic property is given to the layer, and sticking of dirt on the layer surface is eliminated.

A pot of the present invention is provided with hollow micro-capsules in the coating layer for an area at least above a heater. When liquid in a pot boils, vapor bubbles and explodes at the surface of the coating area above a heater to make noise. The coating layer above the heater that contains inorganic staff such as powdered charcoal, carbon black, for a high content increases the noise creating a greater boiling sound. If the coating layer is provided with hollow micro-capsules in the area above the heater, vibration due to the sound can be suppressed, and increase in the boiling sound can be controlled in addition to the improvement of the taste.

Now in the following, examples of the present invention are described referring to the drawing.

Example 1

FIG. 1 shows a cross sectional view of a pot in accordance with a first example of the present invention. Referring to FIG. 1, a vessel 2 of cylindrical shape is housed in an outer case 1, the vessel 2 is provided with an upper lid 5. The vessel 2 is stamped at a side with a level mark 3 for indicating an approximate level of liquid, and is provided with a heater 4 integrated at the bottom. The pot of the present embodiment has a heating area of approximately 140 $cm^2$ to be heated by the heater, power input to the heater is 1000 W. Inner surface of the vessel 2 is covered with a layer 13. A temperature sensor 11 is attached to the vessel 2 from the underneath for detecting temperature of liquid in the vessel. The temperature sensor 11 is connected to a temperature controller 12 for controlling temperature of the liquid. An electric pump 8 mounted at an outlet 7 of the vessel is activated according to a pushing force exerted on a push button 6; then, the liquid kept in the vessel is discharged from a faucet 10 via a dispensing pipe 9. A pot of the present embodiment has the above-described configuration.

Several sample paints for the coating layer samples were prepared using polyether sulfone resin, a heat-resistant polymer, as the main material. Powdered charcoal for various amounts were added so that contents of the charcoal powder in solid portion in respective sample paints are as specified in Table 1. The charcoal used here is an ordinary black charcoal made of Japanese oak tree. The sample layers of Table 1 have been produced by coating the sample paints on the inner surface of vessel 2, for forming the layer 13.

TABLE 1

| sample No. | charcoal content (wt %) | Results | | |
|---|---|---|---|---|
| | | Taste | layer adhesion | Overall judgement |
| 1 | 0.5 | G | E | G |
| 2 | 1 | G | E | G |
| 3 | 2 | E | E | E |
| 4 | 50 | E | E | E |
| 5 | 30 | E | E | E |
| 6 | 5 | G | G | G |
| 7 | 70 | P | B | B |

Table 1 compares the taste of beverages prepared using hot water that has been kept in the vessel (hereinafter it is simply referred to as taste; Table 1 is also described using the same terminology). The adhesive property of the painted layers were also compared in Table 1.

The taste was evaluated on by five tasters who were served with green teas prepared under certain specific conditions using hot waters kept in respective vessels. The results of tasting by five tasters were averaged, and the averaged result was shown using following symbols E through B; where, E signifies "excellent taste", G "good taste", P "poor taste" and B "bad taste". The adhesive property of the coating layers was tested through a cross-cut peeling test using a adhesive tape. The peeling test was conducted on vessels which have undergone boiling cycles for an assumed lifetime (practical durability test). The test results were shown using the same symbols used in the above evaluation by tasting. The symbols G and higher represent those practically acceptable.

Results of the respective evaluation and test, as well as the overall judgement, are shown in Table 1. As Table 1 shows, the coating layers containing the powdered charcoal for 0.5–50 weight % provide satisfactory results in both the beverage tasting (green tea, in the present example) and the coating layer characteristics test. Especially favorable results are obtained by the samples No. 3 through 5, which contain 2–30 weight % of the powdered charcoal.

Presumed reasoning of the above-described favorable improvement in the taste includes;

that the powdered charcoal contained in the coating layer radiates infrared ray which improves the liquid quality through the infrared ray effects, and that calcium, magnesium or the like minerals contained in the charcoal powder dissolved out of the coating layer for a very small quantity through the layer surface that is making direct contact with liquid improve quality of the water, or hot water in the vessel.

As the result, beverages prepared using the water have an improved taste. Furthermore, there are more reasoning presumed; that a compound formed mainly of alkali earth metal elements such as calcium, magnesium and a compound formed mainly of alkali metal elements such as potassium, sodium contained in the charcoal powder dissolve into the water to shift its property towards alkaline side. The alkali-shifted water exhibits a higher extracting power in preparing Japanese tea, black tea, coffee and other beverages, making them tastier. It is also said that when such alkali-shifted water is used for boiling foods, the cooking time can be made shorter and finished better.

Although the coating layer 13 containing charcoal powder makes immediate contact with the liquid kept in the vessel 2 in a configuration of the present example, it is not limited to such a structure. For example, the coating layer 13 may be covered in part with other layer formed mainly of polyether sulfone, which transmits the infrared ray. The infrared ray radiation effect also works under this configuration. The very small amount of materials dissolving out of the charcoal powder through the coating layer 13 in a region making immediate contact with the liquid also works for improving the liquid quality.

Example 2

With the pots of example 1, other samples of the coating layer 13 were prepared using charcoal powder of different particle diameters, as shown in Table 2. Amount of the powdered charcoal added in the layers is 5 weight % in all of these samples.

TABLE 2

| sample No. | Particle diameter (µm) | corrosion resistivity | contamination prevention | overall judgement |
|---|---|---|---|---|
| 8 | 1 | E | E | E |
| 9 | 10 | G | G | G |
| 10 | 20 | B | P | B |

(results column spans corrosion resistivity, contamination prevention, overall judgement)

The sample layers of Table 2 were tested in layer characteristics of the coated layer and in contamination prevention property.

Test in the layer characteristics was conducted with respect to swelling and adhesion property of the layers, after keeping hot salt water of a certain specific concentration in the vessel for a specified duration. Evaluation results were represented with the symbols E through B. Method (salt concentration, duration for keeping warm and status of the layer) and the results of the above-described evaluation have a sufficient co-relationship in the requirement level with those in other practical evaluations conducted on the pots.

With respect to the contamination prevention property, the layers first underwent the earlier-described "practical durability test", and then the easy-to-clean characteristic was tested.

Results of the tests are shown in Table 2. As it shows, the coating layers containing charcoal powder in excess of 10 µm in the particle diameter showed a deteriorated performance in both the layer characteristics and the contamination prevention property. Meanwhile, the powdered charcoal whose particle diameter is smaller than 1 µm exhibited a superior performance.

Example 3

With the pots of example 1, other samples of coating layer 13 were provided using charcoal powders containing iron for different contents as shown in Table 3. In the same manner as in example 2, amount of the powdered charcoal added in the sample layers is fixed to be 5 weight % with all of the samples.

Tasting was conducted with the above samples in the same manner as in embodiment 1, and the results are also shown in Table 3.

TABLE 3

| sample No. | iron contents wt % | Tasting results |
|---|---|---|
| 11 | 0.05 | E |
| 12 | 0.1 | G |
| 13 | 0.5 | B |

As Table 3 shows, the sample layers containing iron for not more than 0.1 weight % provided liquid of good taste. More preferred is an iron content not higher than 0.05 weight %.

Example 4

With the pots of example 1, other samples of layer 13 were provided, using powdered charcoal and carbon black respectively for different percentages as shown in Table 4. Results of the tasting with the samples are also shown in Table 4.

TABLE 4

| sample No. | charcoal contents (wt %) | carbon black contents (wt %) | tasting results |
|---|---|---|---|
| 14 | 0.5 | 0.5 | G |
| 15 | 0.5 | 1.0 | E |
| 16 | 0.5 | 3.0 | E |
| 17 | 0.5 | 5.0 | E |
| 4 | 5.0 | 0 | E |

As Table 4 shows, the sample layers containing a minimum charcoal of 0.5 weight % improved the taste to the same level as sample No. 4, which contains the charcoal for 5 weight %, if carbon black is added for not less than 1 weight %. The particle diameter of carbon black is generally less than 0. 1 µm, which means that it is extremely finer by the order of more than one digit relative to charcoal powder. Namely, if carbon black is added e.g. for the same amount as the powdered charcoal, the gross surface area increases amazingly. Therefore, the infrared ray radiation from the surface increases. It is presumed that the effect of taste improvement has increased in proportion to the amount of infrared ray radiation.

Example 5

With the pots of example 1, other samples of coating layer 13 were provided, using powdered charcoal of different kinds for different amounts as shown in Table 5. Results of the tasting with the samples are also shown in Table 5.

TABLE 5

| sample No. | Charcoal contents (wt %) | kinds of charcoal | tasting results |
|---|---|---|---|
| 2 | 1.0 | black charcoal | G |
| 18 | 1.0 | Bincho-tan | E |
| 6 | 50 | black charcoal | G |
| 19 | 50 | Bincho-tan | E |

As Table 5 indicates, the layers provided with Bincho-tan charcoal exhibit a better taste, comparing the sample layers containing powdered charcoal for the same amount.

Presumed reasons for the above results are as follows:

Regarding the samples No. 2 and No. 18, both containing a smaller amount of charcoal powder, the Bincho-tancontaining sample layer No. 18 provided more potassium, sodium or the like alkali metal elements dissolved from the layer contribute to the taste improvement.

Regarding the samples No. 6 and No. 19, although both layers contain a higher amount of charcoal powder, dissolving of taste-deteriorating impurities is less with the Binchotan-containing layer No. 19.

Example 6

With the pots of example 1, other samples of coating layer 13 were provided, using powdered charcoal, and fluoro-carbon resin for different amounts as shown in Table 6. The fluoro-carbon resin used here is polytetrafluoroethylene (PTFE). These sample layers were tested with respect to an easy-to-clean property. The sample layers, after undergoing the earlier-described practical durability test, were wiped with wetted sponge made of polyamide resin for removing surface contamination. The sample layers were evaluated from the view point of leaning easiness using the evaluation symbols E through B. The results are shown also in Table 6.

TABLE 6

| sample No. | charcoal content (wt %) | PTFE content (wt %) | cleaning easiness |
|---|---|---|---|
| 4 | 5.0 | 0 | P |
| 20 | 5.0 | 5.0 | G |
| 21 | 5.0 | 10 | E |

As Table 6 shows, sample No. 4, which contains no fluoro-carbon resin, was difficult to clean; while sample No. 20, which contains fluoro-carbon resin for 5 weight %, was cleaned with ease. Sample No. 21, which contains fluoro-carbon resin for 10 weight %, showed a higher easiness of cleaning. Thus, inclusion of fluoro-carbon resin in the layer resulted in an improved easy-to-clean property.

Example 7

With the pots of example 1, other samples of coating layer 13 were provided, using powdered charcoal, and hollow micro capsules for different amounts as shown in Table 7. The hollow micro capsules used here are porous silica micro capsules.

The sample layers were compared with respect to boiling sounds. Boiling was conducted in a room of approximately 30 dB dark noise level (ambient of an ordinary home in daytime). Boiling noises were evaluated on using symbols E through P; where, P representing a state "rather annoying", G "not annoying" and E "not annoying at all". Test results are shown in Table 7.

TABLE 7

| sample No. | charcoal content (wt %) | micro capsules content (wt %) | boiling sound evaluation results |
|---|---|---|---|
| 4 | 5.0 | 0 | P |
| 22 | 5.0 | 5.0 | G |
| 23 | 5.0 | 10 | E |

As Table 7 shows, the sample No. 4, which contains no silica micro capsule, generated somewhat annoying boiling noises, while sample No. 22, which contains the micro capsules for 5 weight %, produced hardly any annoying noise. The sample No. 23, which contains the micro capsules for 10 weight %, did not generate any disturbing sound. Thus, inclusion of hollow micro capsules in the coating layer is effective to suppress boiling sounds of pots.

Although the above examples have been described using pots as the liquid containers, the improvement effects produced in accordance with the present invention are not limited to the pots. The same effects can be obtained when it is applied to a canteen, a tumbler, other liquid containers, a vacuum bottle or the like equipment for heating liquid, as well as equipment for keeping heated liquid.

Although a black charcoal made of Japanese oak tree was used in the above exemplary embodiments, kind of charcoal is not limited only to the black charcoal. Other black charcoals of another kind of oak tree, an evergreen oak, pine tree, a Japanese chestnut, etc., white charcoals carbonized at a higher temperature using such trees or charcoals made with processed sawdust, etc. equally produce the same effects.

Although the above example has been described using hollow micro capsules included in the entire coating area in the vessel, the micro capsules included coating area might be only above area of the heater in the vessel. In such coating manner, the cost of coating material can be reduced while maintaining the same sound suppression effect.

Table 8 compares the Bincho-tan charcoal made of Ubamegashi (*Quercus phillyraeoides* A. Grey) tree and the black charcoal made of a Japanese oak tree in their compositions.

TABLE 8

| ash | Bincho-tan 1.87% | | Black charcoal (Japanese oak) 1.77% | | notes |
|---|---|---|---|---|---|
| | % to charcoal | % to ash | % to charcoal | % to ash | |
| silicon | 0.007 | 0.36 | 0.017 | 0.90 | $SiO_2$ |
| iron | 0.007 | 0.36 | 0.023 | 1.76 | $Fe_2O_3$ |
| aluminum | 0.104 | 5.39 | 0.004 | 0.23 | $Al_2O_3$ |
| titanium | 0.001 | 0.05 | 0.004 | 0.23 | $TiO_2$ |
| Manganese | 0.095 | 4.92 | 0.004 | 0.23 | MnO |
| calcium | 0.630 | 32.64 | 0.811 | 45.62 | CaO |
| Magnesium | 0.497 | 25.75 | 0.089 | 5.01 | MgO |
| sodium potassium | 0.398 | 20.63 | 0.029 | 16.29 | $K_2O + Na_2O$ |
| Phosphor | 0.060 | 3.11 | 0.046 | 2.60 | $P_2O_3$ |
| Carbonic acid | 0.131 | 6.79 | 0.482 | 27.13 | $CO_2$ + etc |

As described in the above examples, a pot of the present invention provides water, or hot water, that offers an improved taste to a beverage prepared using the water or the hot water kept in the pot.

What is claimed is:

1. An electric thermo pot comprising:

a vessel for keeping liquid;

an outer case for holding said vessel;

a heater for heating said liquid;

a temperature sensor for detecting temperature of said liquid; and temperature controller for controlling temperature of said liquid;

wherein said vessel is provided with a coating layer formed on the inner surface, said coating layer containing at least powdered charcoal.

2. The electric thermo pot of claim 1, wherein said coating layer contains said powdered charcoal of 0.5–50 weight %.

3. The electric thermo pot of claim 1, wherein particle diameter of said powdered charcoal is not greater than 10 μm.

4. The electric thermo pot of claim 1, wherein iron composition contained in the charcoal powder is not more than 0.1 weight %.

5. The electric thermo pot of claim 1, wherein said coating layer contains carbon black of not less than 1 weight %.

6. The electric thermo pot of claim 1, wherein said powdered charcoal is powder of a Bincho-tan charcoal, where Bincho-tan charcoal is made of a tree called Ubamegashi (*Quercus phillyraeoides* A. Grey).

7. The electric thermo pot recited in one of claims 1 through 6, wherein said coating layer contains fluoro-carbon resin.

8. The electric thermo pot recited in one of claims 1 through 6, wherein said layer contains hollow micro capsules.

9. The electric thermo pot of claim 7, wherein said layer contains hollow micro capsules.

10. The electric thermo pot of claim 8, wherein said hollow micro capsules are provided in a coating layer in a region above said heater.

11. The electric thermo pot of claim 9, wherein said hollow micro capsules are provided in a coating layer in a region above said heater.

* * * * *

UNITED STATES PATENT AND TRADEMARK OFFICE
CERTIFICATE OF CORRECTION

PATENT NO. : 6,369,364 B1
DATED : April 9, 2002
INVENTOR(S) : Jun Oe et al.

It is certified that error appears in the above-identified patent and that said Letters Patent is hereby corrected as shown below:

<u>Title page,</u>
Item [30], Foreign Application Priority Data, delete "12-111763" and insert
-- 2000-111763 --

Signed and Sealed this

Fifth Day of August, 2003

JAMES E. ROGAN
*Director of the United States Patent and Trademark Office*